United States Patent [19]

Toro et al.

[11] Patent Number: 4,728,525

[45] Date of Patent: Mar. 1, 1988

[54] PROCESS FOR THE DECAFFEINATION OF GREEN COFFEE

[76] Inventors: Pablo Toro, Transversal 44 B No. 101-01; Marco Quijano, Calle 26 A No. 37-28, both of Bogota, Colombia

[21] Appl. No.: 850,075

[22] Filed: Apr. 7, 1986

Related U.S. Application Data

[63] Continuation of Ser. No. 680,806, Dec. 12, 1984, abandoned.

[30] Foreign Application Priority Data

Dec. 13, 1983 [DE] Fed. Rep. of Germany ....... 3345006

[51] Int. Cl.$^4$ ................................................ A23F 5/20
[52] U.S. Cl. .................................... 426/481; 426/427
[58] Field of Search ............................... 426/427, 481

[56] References Cited

U.S. PATENT DOCUMENTS

| | | | |
|---|---|---|---|
| 4,255,461 | 3/1981 | Javosky et al. | 426/427 X |
| 4,322,445 | 3/1982 | Peter et al. | 426/427 X |
| 4,344,974 | 8/1982 | Sirtl | 426/427 X |
| 4,411,923 | 10/1983 | Hubert et al. | 426/427 X |
| 4,472,442 | 9/1984 | Katz | 426/427 X |

Primary Examiner—Joseph Golian
Attorney, Agent, or Firm—Birch, Stewart, Kolasch & Birch

[57] ABSTRACT

An improvement in the process of decaffeinating green coffee at high pressure with moist carbon dioxide gas in the supercritical state. The decaffeination takes place in a heating profile of at least two distinct heating periods for predetermined times. During the first heating period, the temperature is maintained between 40° C. and 70° C. This first period may be conducted in several steps or in a single rising temperature step. In the second heating period, the temperature is maintained above 70° C. but below 85° C. The second heating period constitutes between one-fifth and one-third of the total heating time resulting in a higher quality product with the same quantity of caffeine removed as prior processes run at a single temperature.

15 Claims, 4 Drawing Figures

PROCESS FOR THE DECAFFEINATION OF GREEN COFFEE

This application is a continuation of application Ser. No. 680,806 filed on Dec. 12, 1984, now abandoned.

BACKGROUND OF THE INVENTION

The invention relates to a process for the decaffeination of green coffee with carbon dioxide in the supercritical state at a pressure of 200 to 300 bar and a programmed stepwise temperature of 60° C. for 4 hours, 70° C. for the second 4 hours and 85° C. for the final 4 hours of the extraction period.

To avoid the known disadvantages of organic solvents such as trichloroethylene or methylchloride, it is within the skill of the art to extract the caffeine from the raw coffee with supercritical gases, especially carbon dioxide. This method has been selected because carbon dioxide, is a naturally occurring product that is not hazardous to the human organism. Apart therefrom, no undesired residues remain in the decaffeinated coffee beans.

More specifically, a process is known for preparing caffeine-free coffee extract by separating the aroma constituents, extracting the caffeine and rearomatizing the decaffeinated product, wherein, first, the coffee oil containing the aroma constituents is removed from the roasted coffee with a dry, supercritical fluid, then the material to be extracted is moistened with water and the caffeine removed from the moistened material to be extracted with a moist, supercritical carbon dioxide, after which the material to be extracted is processed further in a manner know from the prior art. The fluid charged with the caffeine is segregated in a special container by changing the pressure and/or temperature of the stream of carbon dioxide. The dry, supercritical fluid used for removing the coffee oil from the raw coffee and the moist, supercritical carbon dioxide used for the subsequent extraction of the caffeine are above the critical temperature and the critical pressure. For carbon dioxide, the supercritical state means a temperature above 31.3° C. and above approximately 80 at. To protect the aroma and taste it is expressly recommended that both the coffee oil and the caffeine be extracted at 40°–50° C., the pressure preferably being above 180 at., but for practical and economic resons not above 350 at (Austrian Patent No. 319,722).

This prior art process suffers particularly from the disadvantage that relatively large quantities of carbon dioxide, have to be employed to extract the coffee oil as well as the caffeine, and that the decaffeination is relatively time-consuming, because it is performed at a low rate of decaffeination, added to which is the separate processing step of moistening the coffee with water after the coffee oil has been extracted.

It is likewise within the skill of the art to decaffeinate raw coffee in a heated pressure vessel subjecting the supercritical carbon dioxide at 70° C. to a pressure of around 160 at. First, the carbon dioxide moves upward through the water, so that it is charged with water (Austrian Patent No. 190,982). Then, the moist carbon dioxide spreads through the coffee, yielding a portion of its water to the coffee beans and being concurrently charged with caffeine. The carbon dioxide charged with caffeine is passed from the pressure vessel via a heat exchanger to another pressure vessel which is charged with activated carbon. The second pressure vessel is heated to a temperature of around 25° C. The carbon dioxide charged with caffeine is then cooled by the heat exchanger to around 25° C., at which temperature the carbon dioxide becomes liquid. Simultaneously, the water is removed. Therefore, a stream of some water with a considerable amount of liquid carbon dioxide, and caffeine dissolved therein enters the second pressure vessel. When this stream passes through the pressure separator, the caffeine is retained on the activated carbon. The liquid carbon dioxide and the water are returned to the first pressure vessel via the heat exchanger attaining once again the supercritical conditions.

Instead of an adsorption of the caffeine on activated carbon in the pressure separator, another version is known whereby the caffeine is also removed from the carbon dioxide by allowing it to expand below the critical pressure.

With the prior art process described above the caffeine can be extracted from the raw coffee, but large quantities of carbon dioxide are required, and in addition, a correspondingly long extraction time is required. Indeed, in this connection a selected value temperature in the first pressure vessel should be set in the range from 40° to 80° C. and the selected pressure should be set in the range from 120 to 180 at. This leads to operation in isothermal and isobaric conditions. However, at sustained higher temperatures above 70° C. one has to be prepared for losses in the quality of the decaffeinated coffee.

Large quanities of carbon dioxide are necessary in the above-mentioned temperature and pressure range for the production of 97% caffeine free green coffee. At least 50 kg of carbon dioxide are needed per hour per kg of coffee per hour. For extended extraction times this requires large equipment dimensions as well as a high consumption of power for pumps, heat exchangers and other system components. The large quantities of carbon dioxide which, in accordance with the prior art process, are to be circulated in the system make it particularly difficult to remove the caffeine from the charge carbon dioxide, because the caffeine concentration is correspondingly low. Therefore, in order to remove the caffeine one needs an expensive activated-carbon bed on which caffeine can be absorbed. The caffeine is then practically lost because of the prohibitive cost of extracting it from activated carbon.

It is also known that green coffee with its natural water content can be used for the conventional decaffeination with water and chlorinated solvents (Process of General Foods; Dowe Egberts). However, these prior art processes have never been practiced industrially, suggesting the processes have problems.

SUMMARY OF THE INVENTION

Therefore, the major object of the present invention is to improve the decaffeination process and apparatus mentioned in the introduction so that optimum decaffeination is achieved with small flows of $CO_2$ in a short decaffeination period. Thus, the plant provided for the decaffeination is designed for a low throughput of carbon dioxide and the power consumption for the operation of this plant is correspondingly low. Futhermore, the decaffeination process provides the necessary conditions for extracting the caffeine from the charged carbon dioxide. In particular, this processing step for removing the caffeine from the charged carbon dioxide does not use activated carbon for the adsorption coupled with a cost-competitive process flow.

The objects of the present invention are fulfilled by a process comprising the steps of: (a) providing a quantity of green coffee with a moisture content of 40 to 50% to be treated; (b) circulating an extractant consisting essentially of carbon dioxide gas saturated with water in the supercritical state through said quantity of green coffee; (c) maintaining said quantity of green coffee at selected pressure in the range of 200 to 300 bar; and (d) heating said quantity of green coffee at rising temperatures that are automatically controlled for a predetermined period up to about 70° C. and above 70° C. for an additional period to permit said carbon dioxide gas to extract caffeine from the green coffee, the majority of the extractable caffeine being extracted during said predetermined period and the remainder of the extractable caffeine being extracted during said additional period, wherein said additional period of time is one-fifth to one-third of the total decaffeination time.

For the decaffeination process, green coffee with its natural moisture content of approximately 50% such as found in the producer country before any processing is used. But green coffee that has been enriched to attain a moisture content corresponding to the natural moisture content may also be used. When using the natural moisture content of green coffee with natural moisture content for the decaffeination with supercritical carbon dioxide under the novel conditions proposed by the invention, the problems occurring during the conventional decaffeination process with chlorinated solvents are obviated.

To obtain the green coffee, the fruit pulp is separated from the coffee beans by conventional processes. The beans thus obtained have a parchment-like upper skin with a certain amount of residual pectines. In a subsequent cleaning operation, the beans are freed from the residual pectines and washed with water. The coffee thus obtained has under its upper skin a moisture content of around 50% by weight. Then, the upper skin is removed and the shelled green coffee so obtained is subjected with its natural moisture content to the decaffeination process with supercritical carbon dioxide gas as taught by the invention.

In the novel process of the present invention, it is essential that the decaffeination time and/or the use of supercritical carbon dioxide gas be substantially reduced by allowing the temperature at which the decaffeination takes place to rise while being automatically controlled for a predetermined period. The temperature then exceeds 70° C. only during a fraction of the whole decaffeination process. Maintaining the decaffeination process under 70° C. has hitherto been considered essential for production of aromatic and tasty decaffeinated coffee. It has been found by this invention that if this upper temperature is exceeded for a relatively short period, the decaffeination is vastly promoted, so that over time the decaffeination curve does not approach asymptotically a limiting value of complete freedom from caffeine, but runs along with a relatively steep slope even if the decaffeination process is of rather long duration. Thus, it has been found that the temperature of 70° C. hitherto considered as an upper limit holds good only with the usual permanent load of the coffee during the entire decaffeination period. Since in the indicated rising temperature profile automatically controlled for a predetermined period the carbon dioxide throughput is adequate to achieve the same decaffeination effect, the caffeine concentration of the charged carbon dioxide increases proportionately which, in turn, facilitates the removal of the caffeine from the carbon dioxide. This removal occurs at a lower, but still supercritical, pressure of the carbon dioxide, and its temperature need not be made lower than that prevailing during the decaffeination process. Therefore, to return the caffeine-free carbon dioxide to the decaffeination process, little additional energy need be supplied.

However, it is absolutely essential that the decaffeinated coffee be tasteful and aromatic while retaining its natural coloring. Thus, no additional facilities are required for dearomatization of the coffee prior to decaffeination.

In a progressive temperature rise of the carbon dioxide controlled automatically for a prespecified period during decaffeination, a substantially constant decaffeination rate, and thereby a caffeine charge of the carbon dioxide during the entire decaffeination process, can be achieved. This promotes the removal of the caffeine from the charged carbon dioxide gas.

BRIEF DESCRIPTION OF THE DRAWINGS

The invention will now be describes with reference to the drawings in which:

FIG. 1 shows how a decaffeination curve $d^1$ pertaining to a constant decaffeination temperature of 60° C.—line a—approaches asymptotically the limiting value d of 100%. It is apparent that the shape of the decaffeination curve dl is relatively flat indicating an extended time for the decaffeination process.

Figure 1:
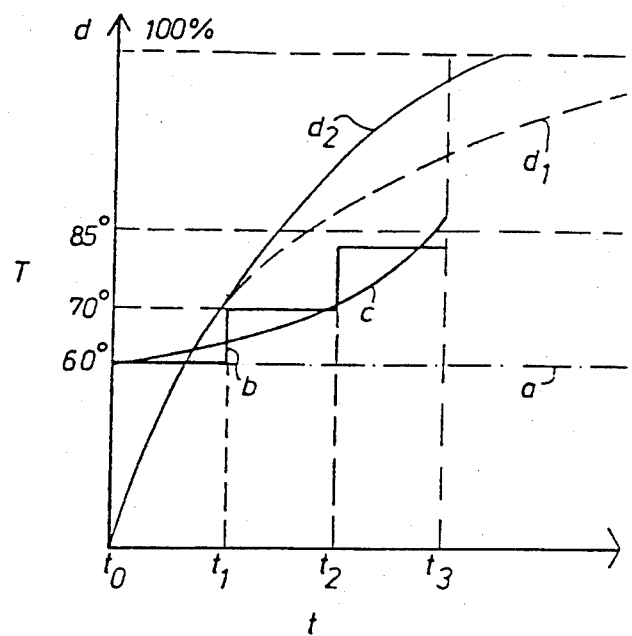
FIG. 1 depicts a typical, periodic temperature profile of the decaffeination process and corresponding decaffeination curves.

On the other hand, in accordance with the present invention, the temperatures of the decaffeination controlled automatically for a prespecified period rise in staircase fashion—curve b—or progressively—curve c. Decaffeination curve $d_2$ (a graph of % decaffeination vs. time) is included in these temperature profiles of FIG. 1 and its shape above instant $t_1$ is distinguished by a relatively steep slope.

The temperature profile (curve b) of the present invention can be achieved by the following process:
1. Starting material used: green coffee, caffee arabica of the laturra variety. Test are carried out with both:
   (a) shelled green coffee with natural moisture content, and
   (b) green coffee after moistening to a water content of from 40 to 50% by weight,
2. Conditions for the decaffeination process in the extracting column:

| pressure: | 200–300 bar (250 bar) |
|---|---|
| Temperature: | 60° - first 4 hours |
| | 70° - second 4 hours |

-continued

| |
|---|
| 85° - last 4 hours |

CO² flow rate: 17 kg CO² per kg green coffee per hour
3. Degree of decaffeination: 96.5%
4. Decaffeination time for attaining 96.% decaffeination was 12 hours.
5. Conditions for removing the caffeine from the charged carbon dioxide in a separator:
 pressure: 70–100 bar (90 bar)
 temperature: 50°–100° C. (90° C.)

Figure 2:
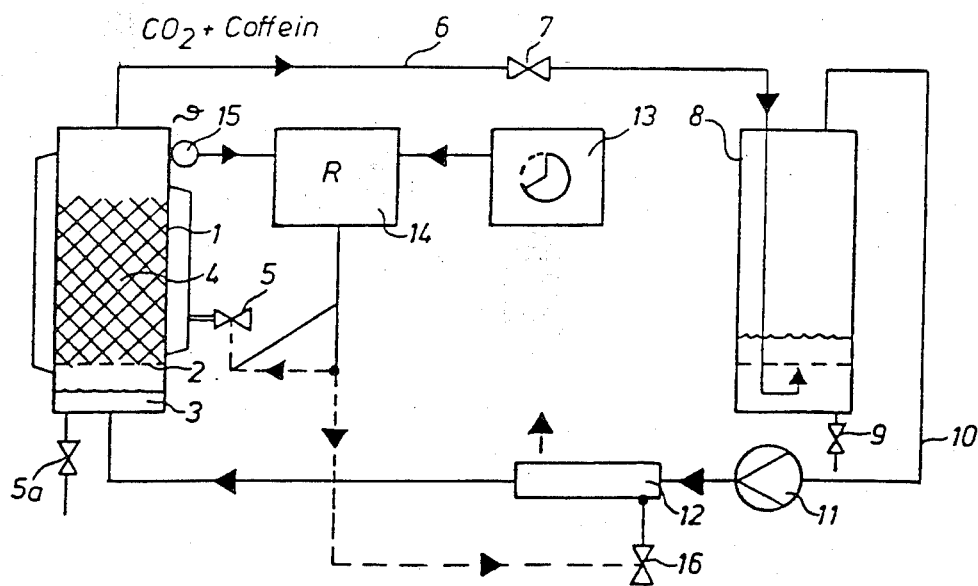
FIG. 2 is a simplified representaion of a batch decaffeination apparatus in accordance with a first embodiment of the present invention.

A batch installation is schematically shown in FIG. 2 wherein an extracting column is denoted by 1. A filter 2 in the extraction column separates a water sump 3 from the coffee 4 to be extracted. The jacket of the extracting column can be heated by hot water fed via a valve 5.

A line 6 extends from the top of the extracting column via an expansion valve 7 to a separator 8 which, like the extracting column, is designed as a pressure vessel. The separator can be heated in a manner known from the prior art, which is not shown in FIG. 2. A valve 9 on the bottom of the separator serves to draw off the water collecting in the separator. Similarly, water can be drawn off via a valve 5a from the extraction column 1, as required.

Separator 8 is connected via a return line 10, a compressor 11, and a heat exchanger 12 to the bottom of extracting column 1.

To automatically control the temperature in extracting column 1 for a predetermined time, a master clock 13 is provided which is set to the desired temperature profile as set point. The master clock is connected to an input of a controller 14, which detects the actual value of the temperature by means of a temperature sensor 15. The controller regulates the temperature with which the extraction in the extracting column is performed by means of the supercritical carbon dioxide passed in the circuit by adjusting the valve 5 and, alternatively, a valve 16 on the heat exchanger.

As an example, 700 g of green coffee with a natural water content of 45% is fed into the extracting column. The caffeine is again extracted with supercritical carbon dioxide gas under the conditions specified in items 1–5 in the foregoing example during a 12-hour period. During this time, 96.5% of the caffeine contained in the coffee is extracted therefrom.

The carbon dioxide charged with the caffeine is passed via line 6 to the expansion valve in which it is reduced to a pressure of 90 bar, while the pressure in extracting column 1 is 250 bar. In separator 8, the water expanded by the expanded carbon dioxide is collected in liquid form together with the extracted caffeine. From this aqueous solution the caffeine can be obtained in processes known from the prior art.

The caffeine-free carbon dioxide is returned via a return line 10, compressed anew to a pressure of 250 bar, preheated in heat exchanger 12, and fed to the bottom of extracting column 1. There, it can move upward through the water and moist green coffee and decaffeinates further the coffee stored above filter 2. Depending upon the setting of the master clock 13, the temperature in the extracting column rises during the decaffeination process until it reaches the desired degree of decaffeination of 96.5%.

Caffeine with a 99.5% degree of purity can be obtained from the aqueous solution by crystallization on the bottom of separator 8.

In another example of the operation of the apparatus depicted in FIG. 2, the extracting column is charged with 700 g remoistened green coffee having a water content of 46%. The caffeine is again extracted under the conditions specified in items 1–5 of the specific example given above. The decaffeination process lasts 12½ hours, during which time 93% of the original caffeine content is extracted.

From the carbon dioxide charged with the caffeine, an aqueous caffeine solution is obtained in separator 8 from which the caffeine can be crystallized with a 99.5% degree of purity.

Figure 3:
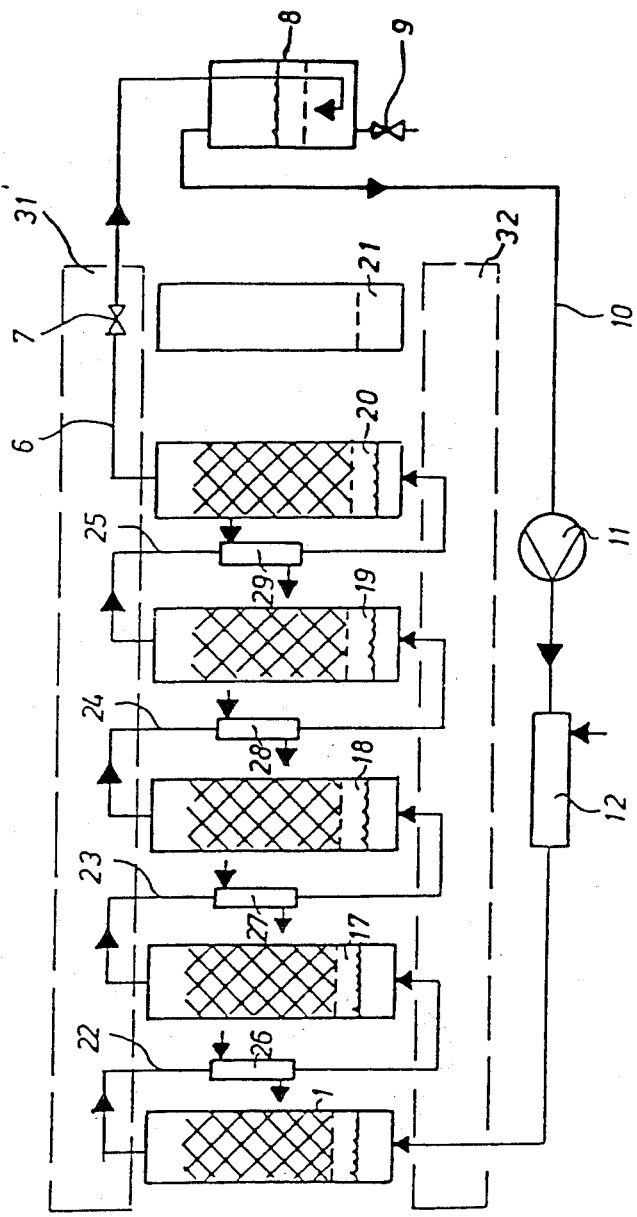
FIG. 3 is a simplified representation of a continuous decaffeination apparatus in accordance with a second embodiment of the present invention.

FIG. 3 illustrates a decaffeination apparatus with a battery of extracting columns which can be run in batches. Like parts of the apparatus bear the same reference numerals as in FIG. 2.

However, instead of only one extracting column, six extracting columns 1, 17, 18, 19, 20, 21 are provided in FIG. 3. At least three of these extracting columns at a time can be arranged in series by connecting the top of a preceding extracting column via one of the lines 22 to 25 and via an additional heat exchanger 26 to 29 to the bottom of the next extracting column.

When the apparatus illustrated in FIG. 3 is operated in accordance with the process described in the above example, each extracting column, e.g., 1, is run at 60° in a first decaffeination phase, the downstream extracting column 17 at 70° C., and the following extracting column 18 at 85° C. The top of the third extracting column can then be connected directly to line 6 if no additional temperature steps are provided. During this first phase, of the group of extracting columns, the extracting column 20, for example, can be discharged by extracting most of the decaffeinated coffee from the column, while another extracting column, e.g. 21, of the group of extracting columns can be discharged by removing a large amount of the decaffeinated coffee from the column, while another extracting column, e.g. 21, is charged anew with green coffee.

In a subsequent phase of the extracting time, the extracting columns are changed over by two valve arrangements 31, 21 indicated only by dotted lines so that no more carbon dioxide will flow through extracting column 18, but can be discharged. The hitherto charged extracting column 21 is now run at 60° C. as a first extracting column of a series arrangement, the next extracting column 1 is then set to a temperature of, say, 70° C., and the last extracting column 17 of the second phase is heated until it attains a temperature of 85° C. In this way, all the extracting columns can be changed over periodically, so that the content of each extracting column is subjected batchwise to a high extraction temperature as shown in FIG. 1 illustrating a temperature profile b as shown in FIG. 1. In the meanwhile, an aqueous coffee solution, from which the caffeine is again obtained by crystallization, continues to accumulate in separator 8.

Figure 4:
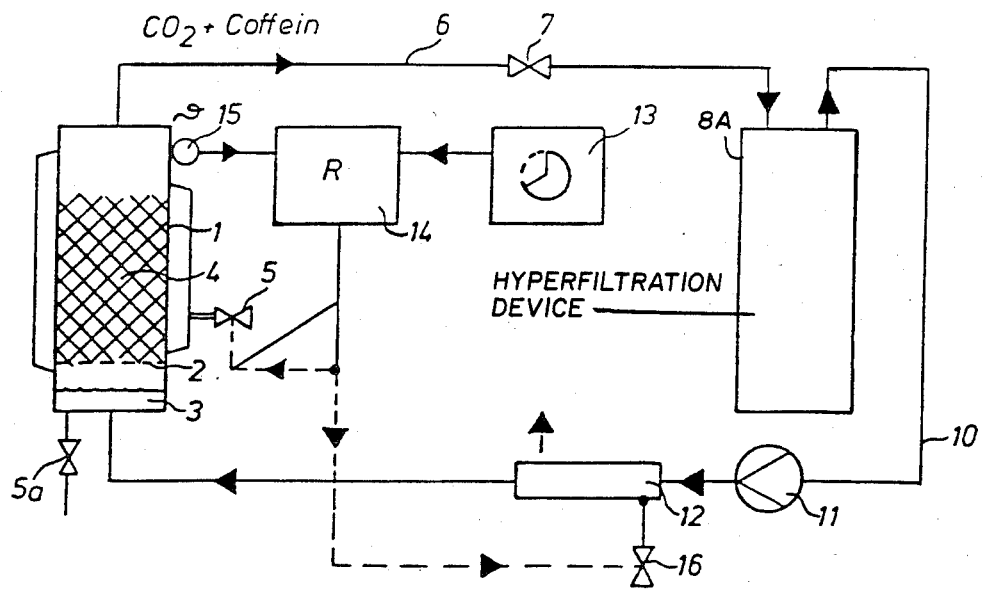
FIG. 4 is a simplified representation of a batch decaffeination apparatus in accordance with a third embodiment of the present invention using a hyperfiltration device.

FIG. 4 illustrates another embodiment of the present invention, similar to the FIG. 2 emobdiment with a hyperfiltration device 8A substituted for the pressure vessel separator 8. Otherwise the system of FIG. 4 operates in a like manner to the system of FIG. 2. Similarly, a hyperfiltration device may be substituted for separator 8 in the system of FIG. 3.

What we claim is:

1. A process for the decaffeination of green coffee wherein at least 93% of the original caffeine content is extracted by treatment of the coffee with carbon dioxide gas saturated with water in the supercritical state at a high pressure and at a temperature of at least 40° C. the improvement comprising the steps of:
   a. providing a quantity of green coffee with a moisture content of 40 to 50% to be treated;
   b. circulating an extractant consisting of carbon dioxide gas saturated with water in the supercritical state through said quantity of green coffee;
   c. maintaining said extractant in contact with said quantity of green coffee at a selected pressure in the range of 200 to 300 bar;
   d. heating said quantity of green coffee for a first predetermined period of time at a temperature at least above 40° C. and up to and including 70° C. and heating for a second predetermined period of time above 70° C. and below 85° C. to permit said carbon dioxide gas to extract caffeine from the green coffee, said second period of time being one fifth to one-third of the total decaffeination time, the majority of the extractable caffeine being extracted during said first period and the remainder of the extractable caffeine being extracted during said second period; and
   e. subsequently removing said caffeine from said carbon dioxide;
   whereby a high quality of decaffeinated coffee is obtained without the use of any additives to the extractant.

2. The process according to claim 1, wherein the temperature rise of the gas runs continuously during the decaffeination of the coffee.

3. The process according to claim 1, wherein there is characterized by progressive periodic temperature rise of the gas during the decaffeination process.

4. The process according to claim 1, wherein the caffeine is removed from the charged gas at a pressure of from 70 to 100 bar and at a temperature of from 50° to 100° C.

5. The process according to claim 1, wherein the temperature rise of the gas runs continuously during the decaffeination of the coffee.

6. The process according to claim 1, wherein there is progressive periodic temperature rise of the gas during the decaffeination process.

7. The process according to claim 1, including the further step of removing the caffeine from the charged gas at a pressure of from 70 to 100 bar and at a temperature of from 50° to 100° C.

8. The process according to claim 1, including the further step of removing the caffeine from the charged gas at a pressure of from 70 to 100 bar and at a temperature of from 50° to 100° C.

9. The process to claim 2, including the further step of removing the caffeine from the charged gas at a pressure of from 70 to 100 bar and at a temperature of from 50° to 100° C.

10. The process according to claim 3, including the further step of removing the caffeine from the charged gas at a pressure of from 70 to 100 bar and at a temperature of from 50° to 100° C.

11. The process according to claim 1, wherein the coffee is decaffeinated with a pressure of the carbon dioxide gas of from 200 to 300 bar and with the following consecutive temperature steps:
    heating said green coffee to 60° C. for the first 4 hours;
    heating said green coffee to 70° C. for the subsequent 4 hours; and
    heating said green coffee to 85° C. for the last 4 hours.

12. The process according to claim 1, including the further step of removing the caffeine from the charged gas at a pressure of 90 bar and at a temperature of 90° C.

13. The process according to claim 11 including the further step of removing the caffeine from the charged gas at a pressure of 90 bar and at a temperature of 90° C.

14. The process according to claim 2, including the further step of removing the caffeine from the charged gas at a pressure of 90 bar and at a temperature of 90° C.

15. The process according to claim 3, including the further step of removing the caffeine from the charged gas at a pressure of 90 bar and at a temperature of 90° C.

* * * * *